L. S. ROBBINS AND W. E. GILMORE.
ROAD SHOE FOR AUTOMOBILES.
APPLICATION FILED JAN. 3, 1920.
1,347,405. Patented July 20, 1920.
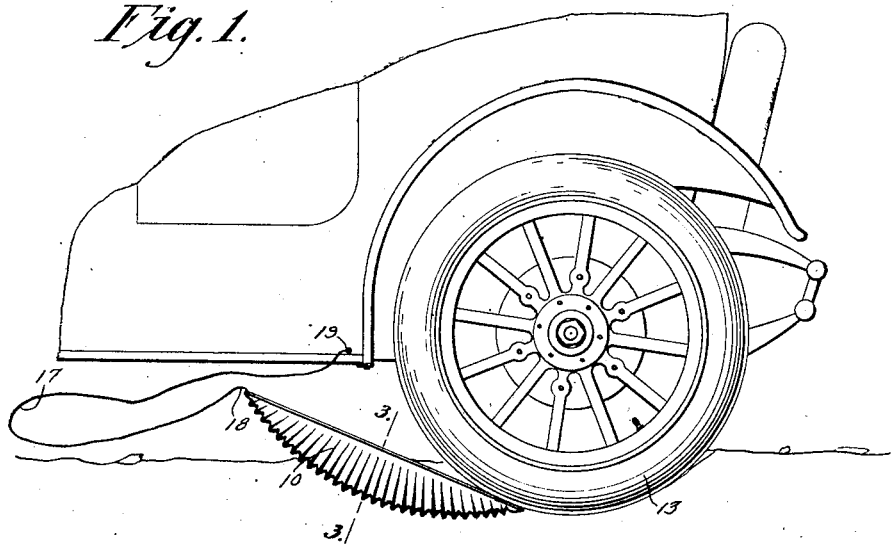
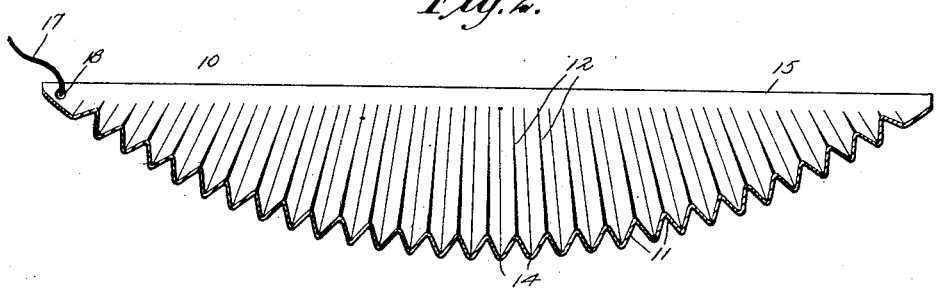
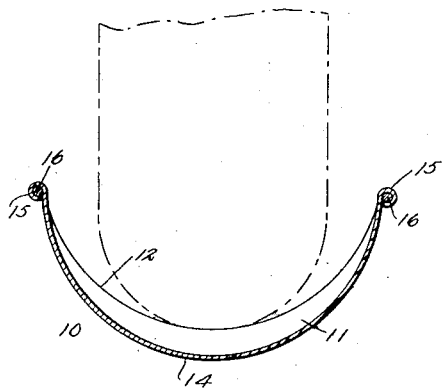

UNITED STATES PATENT OFFICE.

LOUIS S. ROBBINS AND WILLIAM E. GILMORE, OF KLAMATH FALLS, OREGON.

ROAD-SHOE FOR AUTOMOBILES.

1,347,405.  Specification of Letters Patent.  Patented July 20, 1920.

Application filed January 3, 1920. Serial No. 349,313.

*To all whom it may concern:*

Be it known that we, LOUIS S. ROBBINS and WILLIAM E. GILMORE, citizens of the United States, and residents of Klamath Falls, in the county of Klamath and State of Oregon, have invented a new and Improved Road-Shoe for Automobiles, of which the following is a full, clear, and exact description.

This invention relates to automobile accessories or contrivances and has particular reference to means to enable an automobile or similar traction vehicle to easily and quickly extricate itself from a mudhole or other road difficulty.

Among the objects of the invention therefore is to provide for each of the rear or traction wheels a gripping device adapted to be introduced beneath the forward bottom side portion of a traction wheel, which may easily be done by any occupant of the vehicle from the running board and without requiring him to soil his hands or clothing, said device being so constructed as to constitute a sort of a combined gripper and bridge member enabling primarily the traction wheel to secure adequate hold or grip on the road, and secondarily to act in the nature of a bridge over or along which the wheel will be adapted to roll as a result of the friction afforded by the device.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof, reference is had to the accompanying drawings, in which like reference characters designate the same parts in the several views, and in which—

Figure 1 is a side elevation showing diagrammatically a portion of an automobile with one of our devices in place for action.

Fig. 2 is an enlarged longitudinal section of the device.

Fig. 3 is a vertical transverse section on the line 3—3 of Fig. 1.

Referring now more specifically to the drawings we show our improved device or road shoe as being in the nature of an open topped trough having the general form of a segment of a flat circular drum, the bottom being curved longitudinaly in substantially the arc of a circle of materially greater radius than that of the wheel that is intended to be operated thereover, and in cross section the device is preferably arc or crescent shaped and of a radius materially greater than the radius of the wheel, tire or any devices that may be carried thereon or attached thereto.

The device referred to above is indicated as a whole at 10 and is made preferably from sheet metal, or its equivalent, and transversely corrugated with a succession of V-shaped corrugations 11 from one end to the other, the corrugations extending practically all the way across from one side edge of the device to the other. The corrugations may be formed about one inch apart and preferably are provided with relatively sharp inner edges 12 for immediate gripping contact with the wheel tire 13, and likewise corrugations are provided on the bottom surface of the device with relatively sharp edges 14 to insure the firm gripping of the device on the roadway. These features of sharp inner and outer edges being made as incidents of the corrugating or fluting of the metal in the most simple or easily effected manner do not add to the expense of the manufacture of the device while yet affording the most effective gripping results. Furthermore with the corrugations made as set forth the structure possesses ample strength for all practical purposes and will not bend, buckle or flatten out of shape.

The aforesaid longitudinal side edges 15 are preferably bent around reinforcing or stiffening members such as heavy wires or rods 16.

A cord, rope, chain or other suitable flexible device 17 may be attached at one end at 18 to one end of the shoe 10, while the other end of the attachment member may be secured by a clamp or otherwise at 19 to the running board of the machine or any other convenient place. The line 17 is long enough to afford free manipulation of the device 10 in putting it into place and for it to clear the wheel after the machine has passed beyond the mudhole or other cause of obstruction. Furthermore the line is strong enough to enable the device to be dragged behind the machine until a convenient place is reached in the road for the operator to otherwise dispose of the device for further use.

We claim:

1. The herein described road shoe for traction vehicle wheels comprising an open topped trough-like member having the general form of a segment of a flat drum, the bottom surface of which longitudinally is arc shaped on a radius greater than that of the wheel.

2. A road shoe of the character set forth in claim 1 in which the bottom surface is curved transversely on an arc of a circle whose radius is greater than the wheel tire.

LOUIS S. ROBBINS.
WILLIAM E. GILMORE.